United States Patent [19]

Fajeau

[11] Patent Number: 4,643,871
[45] Date of Patent: Feb. 17, 1987

[54] EMERGENCY COOLING DEVICE FOR A PRESSURIZED WATER REACTOR CORE

[75] Inventor: Maurice Fajeau, Pertuis, France

[73] Assignee: Commissariat a l'Energie Atomique, Paris, France

[21] Appl. No.: 197,908

[22] Filed: Oct. 17, 1980

[30] Foreign Application Priority Data

Nov. 16, 1979 [FR] France .................................. 79 28316

[51] Int. Cl.$^4$ .............................................. G21C 9/00
[52] U.S. Cl. .................................... 376/282; 376/277; 376/298
[58] Field of Search .................. 376/282, 277, 298

[56] References Cited

U.S. PATENT DOCUMENTS

| | | | |
|---|---|---|---|
| 3,429,775 | 2/1969 | Petersen | 376/282 |
| 3,981,770 | 9/1976 | Middleton | 376/282 |
| 4,072,560 | 2/1978 | Seidelberger | 376/282 |
| 4,278,500 | 7/1981 | Ailloud | 376/282 |

FOREIGN PATENT DOCUMENTS

| | | | |
|---|---|---|---|
| 1564546 | 12/1969 | Fed. Rep. of Germany | 376/282 |
| 2719897 | 5/1977 | Fed. Rep. of Germany | 376/282 |
| 2298163 | 8/1976 | France | 376/282 |
| 887252 | 1/1962 | United Kingdom | 376/282 |

Primary Examiner—Donald P. Walsh

[57] ABSTRACT

The invention relates to a standby or emergency cooling device for the core of a pressurized water reactor.

A high pressure reservoir filled with boric acid solution is permanently connected to the reactor vessel via two pipes, preferably arriving at the same level. However, one of these pipes is extended within the vessel by a downwardly directed bend in order to issue below the other pipe. These two pipes have horizontal portions which are intended to prevent any natural circulation under normal operating conditions.

Application to the improvement of the safety of pressurized water nuclear reactors.

9 Claims, 1 Drawing Figure

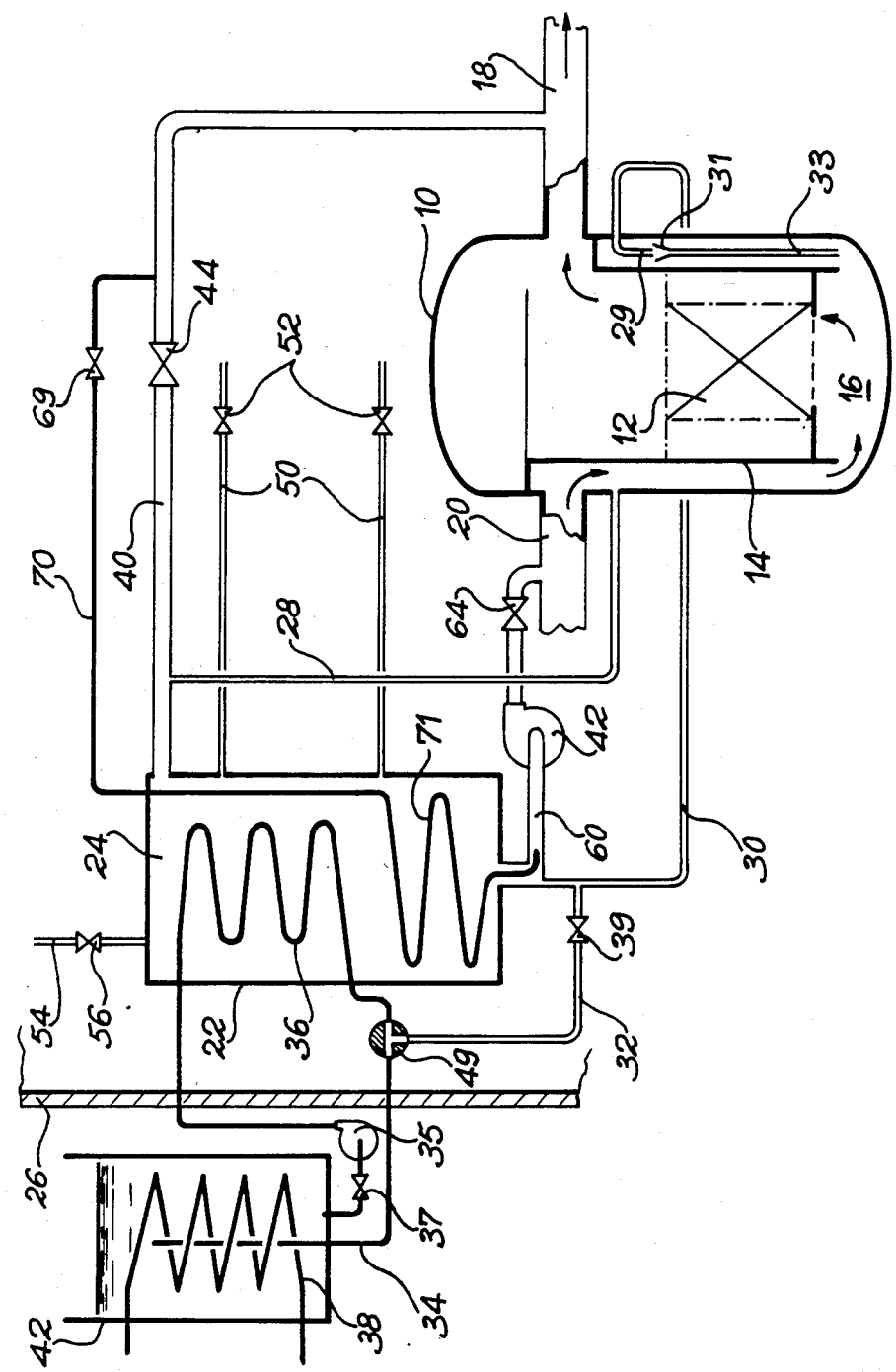

EMERGENCY COOLING DEVICE FOR A PRESSURIZED WATER REACTOR CORE

BACKGROUND OF THE INVENTION

The present invention relates to an emergency standby cooling device for the core of a pressurized water reactor.

The known cooling devices of this types used in reactors generally comprise accumulators filled with pressurized water, which are connected with the primary cooling circuit of the reactor via isolating valves, which are sensitive to a given lower value of the pressure in the primary circuit. The water filling the accumulators is pressurized with nitrogen.

These known devices have a number of disadvantages. Thus, the injection of water from the standby cooling accumulators of the core does not necessarily take place at the most favourable moment. Thus, when the pressure drop in the primary circuit is due to a relatively small fracture of the piping there may be a draining of the primary circuit without an adequate reduction in the primary pressure to bring about the draining of the accumulators. The primary circuit can then be filled by the "high pressure" pumps, however, the latter constitute active systems which may be erroneously manipulated by the operators. In addition, the draining of the accumulators is linked with a value of the primary circuit pressure and not a vessel level, which is the most significant physical magnitude of the need for filling the primary circuit with water.

Moreover, the injection of water into the primary circuit is generally terminated by an injection of nitrogen serving to pressurize the water in the accumulators. This gas can then be trapped either in the inverted U-tubes of the steam generators, or in the upper parts of the hot branches of the primary circuit when the steam generators are of the "single pass" type, in which the primary fluid enters the generator at its upper end and leaves it at its lower end. Thus, in both cases, there is a loss of efficiency of the cold source constituted by the steam generators.

BRIEF SUMMARY OF THE INVENTION

The object of the invention is to provide an emergency cooling device which does not have the disadvantages of the prior art devices and which more particularly makes it possible to inject cold water into the core at the most opportune moment.

Therefore, the present invention relates to a device for the emergency or standby cooling of the core of a pressurized water reactor in which the reactor core is located within a tightly sealed vessel connected by the hot and cold branches of a primary cooling circuit with at least one steam generator, wherein the device comprises at least one water-filled, high pressure reservoir and whose bottom is positioned above the tubes by which the hot and cold branches of the primary circuit enter the vessel, said reservoir being permanently connected to the reactor vessel by a first pipe issuing into the vessel between the said tubes and the high level of the core and by a second pipe issuing into the vessel below the first pipe.

As a result of the device according to the invention, the injection of the emergency water is no longer controlled by isolating valves sensitive to a given lower pressure within the primary circuit and is instead controlled by a reduction of the primary fluid level in the reactor vessel. The starting level is determined by the first pipe connecting the reservoir to the reactor vessel, the steam formed in the case of a reduction in the level entering the said pipe to start the draining of the reservoir.

According to a first variant of the invention, the two pipes enter the vessel at substantially the same level. Preferably, the two pipes then have horizontal portions which are either not or only slightly thermally insulated of an adequate length to prevent any initiation of the flow by natural convection between the vessel and the reservoir under normal operating conditions. None of the pipes connecting the vessel and the reservoir is equipped with a valve.

According to a second variant of the invention, when it is desired to create a flow by natural convection between the vessel and the reservoir, the two pipes enter the vessel at different levels.

According to another feature of the invention, the second pipe may have within the vessel a downwardly directed bend or elbow and entering a funnel extended by a tube making it possible for the injection water to on the one hand partly mix with the hot water of the vessel and on the other to arrive directly at the bottom of the vessel.

According to another feature of the invention, the device also comprises a cooling circuit having a heat exchanger located within the reservoir. This cooling circuit can be the low pressure emergency injection circuit which is used for ensuring the pressure drop of the primary circuit in the case when a crack or opening occurs thereon. As soon as the primary pressure has dropped sufficiently, this cooling circuit ensures the filling of the primary circuit via a three-way valve.

The device according to the invention can also have two pipes for cooling the reactor on shutdown respectively connecting the upper part of the reservoir with at least one hot branch via at least one electrovalve and the lower part of the reservoir with at least one cold branch via an electrovalve and a circulating pump. As a result of this characteristic, the device according to the invention can also be used as a high pressure device for cooling the reactor on shutdown. For the latter function, the water reservoir of the cooling circuit must itself be cooled.

The device according to the invention may also comprise a heating circuit for the water contained in the high pressure reservoir, said circuit having a coil located in the reservoir and whose ends are respectively connected to at least one hot branch and at least one cold branch by means of at least one electrovalve.

According to yet another feature of the invention, the water contained in the reservoirs can be a boric acid solution, whose boric acid concentration is controlled and adjusted by means of a connecting circuit by which the reservoirs are connected to an external chemical and volumetric control circuit.

DESCRIPTION OF THE DRAWING AND PREFERRED EMBODIMENTS

An embodiment of the invention will be described hereinafter in non-limitative manner with reference to the single drawing which diagrammatically shows the pressurized water reactor vessel in which the reactor is equipped with a standby or emergency cooling device according to the present invention.

The drawing very diagrammatically shows the vessel 10 for a pressurized water nuclear reactor, whose core 12 is located within the vessel 10 and is supported by a ferrule or collar 14. The reactor core is traversed by a cooling fluid 16 which flows in the direction of the arrows. The cooling fluid 16, generally constituted by pressurized water in this type of reactor, extracts the heat given off by the nuclear fission in the reactor core and the transfer thereof to the not shown steam generators by a primary cooling circuit. The primary circuit is constituted by a number of loops, but only a hot branch 18 and a cold branch 20 are partly shown in the drawing.

According to the invention, at least one high pressure reservoir 22 filled with boric acid solution 24 is placed in the reactor confinement enclosure 26. In practice, for safety reasons, there are at least two reservoirs like reservoir 22. Each reservoir 22 is placed at a level such that the bottom thereof is positioned above the hot branch 18 and cold branch 20 of the primary circuit. A first pipe 28 permanently connects the top of reservoir 22 to reactor vessel 10 between hot branch 18 and cold branch 20 of the primary circuit and the high level of reactor core 12. A second pipe 30 connects the bottom of the reservoir 22 to vessel 10 which it preferably enters at the same level as pipe 28 in order to prevent the natural flow of water between vessel 10 and reservoir 22. In a not shown variant, pipes 28 and 30 can enter the vessel 10 at two different levels when it is desired for the boric acid solution to flow by natural convection between the vessel and the reservoir.

As illustrated in the drawing, pipe 30 is extended downwards within the vessel 10 by an elbow or bend 29, whose end enters a funnel 31 constituting the upper end of a tube 33 issuing in the vicinity of the bottom of the vessel. The end of bend 29 is at a level close to the high level of core 12 in such a way that if the level in vessel 10 drops the steam formed firstly enters the pipe 28 to start the drainage of reservoir 22. The free space left between the end of bend 29 and funnel 31 makes it possible for the injection water from reservoir 22 to partly mix with the hot water of the vessel, the remainder of the injection water passing directly to the bottom of the vessel via tube 33.

As illustrated in the drawing, each of the pipes 28 and 30 has a substantially horizontal part forming an obstacle to the natural convection of boric acid solution 24 between the reactor vessel and the reservoir. As neither of the pipes 28 and 30 is equipped with a valve, reservoir 22 is directly and permanently connected by said two pipes with reactor vessel 10.

In the represented embodiment, the water 24 in reservoir 22 is cooled by means of a cooling circuit 34 having a coil-shaped heat exchanger 36 located within reservoir 22, a circulating pump 35 and a valve 37. The cooling fluid flowing in circuit 34 comes from a reservoir 42 and is permanently cooled, for example, by means of a second exchanger 38 within reservoir 42.

The cooling circuit 34 is connected to the primary circuit via a standby or emergency injection circuit 32 controlled by a valve 39, which opens when it receives an emergency injection signal and by a three-way valve 49 which, as soon as the primary pressure has dropped sufficiently, permits the filling of the primary circuit by blocking the recirculation of the emergency injection water towards reservoir 42.

Preferably, the emergency cooling device according to the invention also has pipes 40 and 60 for cooling the reactor on shutdown, which respectively connect the upper part and bottom of reservoir 22 with one or more of the hot and cold branches 18, 20 respectively of the primary circuit. These pipes 40 and 60, by means of a pump 42 and after opening the electrovalves 44 and 64, make it possible to remove the sensible heat of the primary circuit and the residual power of the reactor core during the cold shutdown of the latter, no matter what the temperature and pressure of the primary circuit water.

A heating circuit 70 for the water in reservoir 22 is connected with pipe 40 upstream of electrovalve 44. Circuit 70 has an electrovalve 69 and a coil 71, preferably located at the bottom of reservoir 22 and issuing into the nozzle of pipe 60. The ends of coil 71 are thus indirectly connected by pipes 40 and 60 to the hot and cold branches 18, 20 respectively of the primary circuit. Thus, this circuit is arranged in such a way that it causes no movement of the water of reservoir 22 towards the primary circuit, thus making it possible to keep the boron concentration of the reservoir at a constant level.

Obviously, the water in reservoir 22 can be heated by any means (e.g. electricity).

In the represented embodiment, the boric acid concentration of the water 24 contained in reservoir 22 is controlled and adjusted by means of a circuit 50 comprising two electrovalves 52. Circuit 50 connects reservoir 22 to a conventional chemical and volumetric control circuit outside the confinement enclosure 26 of the reactor.

Finally, a purging or draining circuit 54, controlled by an electrovalve 56, issues into the upper part of reservoir 22.

The operation of the pressurized water reactor partly described with reference to the drawing is identical to that of known reactors of this type and will not be further described here.

During an accidental decompression of the primary circuit resulting from a loss of primary fluid through an opening or crack formed in a pipe, the optionally cold boric acid solution contained in reservoir 22 is automatically discharged by pipe 30 into reactor vessel 10 as soon as the water level in said vessel drops below the entry point of pipe 28. Thus, the putting into operation of the device according to the invention, is automatically controlled by the drop in the water level in the reactor vessel, without it being necessary to use one or more electrovalves. In addition, this is in no way linked with the opening of valves. Thus, the cooling of reactor core 12 is always ensured as soon as the latter is exposed to the risk of being drained, i.e. at the most opportune moment, no matter what the size of the crack or opening formed in the primary circuit. Thus, the device according to the invention is much more efficient than the prior art devices in which the putting into operation is controlled by isolating valves sensitive to a given pressure in the primary circuit.

The device described relative to the drawing also makes it possible to ensure the cooling of the reactor on shutdown by opening electrovalves 44 and 64 and by making the primary fluid flow between vessel 10 and reservoir 22 by means of pump 42 located in pipe 60. The primary fluid is then cooled in reservoir 22 by means of cooling circuit 34 and in particular exchanger 36. The present device thus makes it possible to remove the sensible heat from the primary circuit and the residual power from the reactor core 12 during the cold shutdown of the reactor, without it being necessary to wait for the temperature and pressure of the primary circuit water to drop significantly compared with their normal operating value.

Obviously, the invention is not limited to the embodiment described hereinbefore. In particular, the pipes 40 and 60 for cooling the reactor on shutdown can optionally be eliminated and in this case the device will only carry out the standby cooling of the reactor core in the case of an accident through loss of primary fluid. Circuit 50 which makes it possible to control and adjust the boric acid concentration in the water 24 contained in reservoir 22 can also be eliminated or replaced by any equivalent device.

What is claimed is:

1. A device for the emergency cooling of the core of a pressurized water reactor in which the reactor core is located within a tightly sealed vessel connected by hot and cold branches of a primary cooling circuit with at least one steam generator, wherein said device comprises at least one water-filled, high pressure reservoir, the bottom of said reservoir being positioned above tubes by which the hot and cold branches of the primary circuit enter the vessel, a first pipe permanently connecting said reservoir to the reactor vessel and issuing into said vessel between the said tubes and a high level of the core, and a second pipe permanently connecting the bottom of said reservoir to the reactor vessel and issuing into said vessel below said first pipe, each of said pipes having a horizontal portion which is not fully thermally insulated.

2. A device according to claim 1, wherein the two pipes enter the vessel at substantially the same level.

3. A device according to claim 1, wherein the two pipes enter the vessel at two different levels.

4. A device according to claim 1, wherein the second pipe has a bend or elbow directed towards the bottom of the vessel and which issues into a funnel constituting the upper end of a tube issuing into the bottom of the vessel.

5. A device according to claim 1, wherein it also comprises a cooling circuit incorporating a heat exchanger positioned within the reservoir.

6. A device according to claim 5, wherein the cooling circuit also comprises a second heat exchanger located in a storage reservoir and three-way valve able to interrupt the water flow in the cooling circuit in order to connect the storage reservoir and the reactor vessel in such a way that the cooling circuit constitutes a low pressure, emergency injection circuit.

7. A device according to claim 1, wherein it comprises two pipes for cooling the reactor on shutdown respectively connecting the upper part of the high pressure reservoir with at least one hot branch via an electrovalve and the lower part of the high pressure reservoir with at least one cold branch via an electrovalve and a circulating pump.

8. A device according to claim 1, wherein it also comprises a circuit for heating the water contained in the high pressure reservoir, which incorporates a coil located in said reservoir and whose ends are respectively connected to at least one hot branch and at least one cold branch via at least one electrovalve.

9. A device according to claim 1, wherein the water contained in the reservoir is a boric acid solution, whose boric acid concentration is controlled and adjusted by means of a circuit by means of which the said reservoir is connected to an external chemical and volumetric control circuit.

* * * * *